United States Patent Office 2,704,288
Patented Mar. 15, 1955

2,704,288

HALO-PHTHALIDES AND METHODS FOR THEIR PREPARATION

Brian L. Hutchings, Pearl River, and Samuel Gordon, Orangeburg, N. Y., assignors to American Cyanamid Company, New York, N. Y., a corporation of Maine No Drawing. Application May 3, 1952,
Serial No. 286,023

12 Claims. (Cl. 260—343.3)

This invention relates to a new class of phthalide compounds and methods of making the same. More particularly this invention relates to a new class of acids, including the 3-methyl-3-hydroxy-4-halo-7-hydroxyphthalides and the 3-methyl-3-hydroxy-4-halo-7-alkoxyphthalides, and their patentable equivalents such as the simple esters.

The new acid compounds of this invention can be represented by the following structural formula:

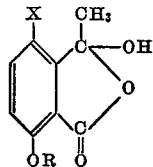

in which R represents hydrogen or a lower alkyl radical and X represents halogen. Compounds of the above formula react in a manner typical of carboxylic acids, or in other words, the hydroxy group in the 3 position behaves not as an ordinary hydroxy group but similar to the hydroxy group in a carboxylic acid. For instance, the new acids of the above formula can be esterified by reaction with an alcohol according to the usual methods of esterification. As an example, the hydrogen of the hydroxy group can be replaced by a methyl radical by reacting the phthalide compound with methyl alcohol in the presence of sulfuric acid. The hydroxy group in compounds of the above formula can also be replaced by a halogen radical by the usual methods of preparing acid halides, or the hydroxy group can be replaced by a NH₂ group by the usual methods of amidation. However, since the esters and acid halides are somewhat different in structure from the usual form, they are referred to as pseudo-esters and pseudo-acid halides. Since the simple acid derivatives can be prepared, by procedures well known to those skilled in the art, from the free acid compounds of this invention, it is intended that they also be considered a part of the present invention.

There is evidence to indicate that the new acid compounds of this invention exist, at least partially, as the keto isomer which can be represented by the following formula:

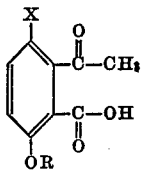

in which R and X are as defined above. Since, however, a larger number of the characteristics of the new compounds are indicated by the phthalide formula, such a formula is employed in this specification and claims to represent the new class of acids, even though they might exist to some extent in a tautomeric form.

The new compounds of this invention are crystalline solids useful in many fields of chemistry. For instance, since the new compounds are very reactive, they are of great value as intermediates in experimental chemistry. The new compounds are also useful per se since they have been found to have antiseptic and fungicidal properties and may be employed in compositions prepared for use as antiseptics and fungicides.

While it is not intended that this invention be limited to the above described new class of compounds when prepared by any one particular procedure, a new method of preparing the new compounds has been discovered and it is intended that this new method also constitute part of the present invention. According to the new method of this invention a 3-methyl-4-halo-7-alkoxyphthalide is treated with a strong oxidizing agent at a temperature of from about 0° C. to the reflux temperature of the reaction mixture, and at a pH of from about pH 6 to pH 10. This new reaction can be more particularly illustrated by the following equation:

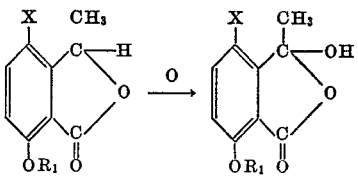

in which R₁ represents a lower alkyl radical and X is as previously defined. If desired, the group designated by R₁ can then be removed by hydrolysis to produce the corresponding hydroxy compound.

The 3-methyl-4-halo-7-alkoxyphthalides, employed as starting materials in the above reaction, can be prepared by any one of several procedures. For instance, they can be prepared by the procedure disclosed in copending United States application S. N. 286,034 filed concurrently herewith or by the procedure disclosed in copending United States application S. N. 286,022 also filed concurrently herewith.

The new reaction of this invention can be conveniently performed in an inert solvent and preferably in an aqueous solvent. Of course, by aqueous solvent it is meant that water is present and various amounts of water-miscible organic solvents, such as dioxane or acetone can be employed in combination therewith. The reaction can also be performed with an organic solvent such as the above as the only solvent, although this is usually not advantageous.

Strong oxidizing agents suitable for the new process of this invention may be illustrated by potassium permanganate and potassium dichromate. Potassium permanganate is preferred since it is more readily employed at the hydrogen ion concentrations suitable for the new process of this invention. The strong oxidizing agent is used in at least stoichiometrical amounts, and preferably in a large excess. With potassium permanganate, the presence of an excess is readily determined by the purple color of the solution, and this is an additional reason why potassium permanganate is the preferred oxidizing agent.

The new process of this invention should be performed at a hydrogen ion concentration of from about pH 6 to pH 10 with the preferred range being pH 7 to pH 8. At pH's lower than about pH 6, undue decomposition is experienced, and at pH's above about pH 10, a secondary reaction becomes predominate. Since, as the oxidation progresses, the reaction mixture tends to become increasingly basic, a careful check on the hydrogen ion concentration of the reaction mixture should be maintained or else a buffer salt should be employed. The latter, of course, is advantageous and salts of strong acids with weak bases, for instance magnesium sulphate, have been found to be quite satisfactory for this purpose.

It is an advantage of the new process of this invention that it can be performed over a wide temperature range with temperatures from the freezing point of the reaction mixture to the reflux temperature of the reaction mixture being satisfactory. The reaction proceeds quite readily at room temperature, although it is accelerated by heating and a somewhat faster reaction is obtained if temperatures in the range of 60° C. to 100° C. are employed. At room temperature, i. e., 20° C. to 30° C., the reaction is usually complete in about two to three hours and at 100° C. the reaction is usually complete in about forty-five minutes.

The invention will be more particularly illustrated by the following specific examples in which all parts are by weight unless otherwise indicated.

EXAMPLE I

*3-hydroxy-3-methyl-4-chloro-7-methoxyphthalide*

185 mgs. of 3-methyl-4-chloro-7-methoxyphthalide, prepared by the procedure disclosed in copending United States application S. N. 286,022 filed concurrently herewith, were dissolved in 7.5 ml. of pyridine and then 38 ml. of water containing 7.4 grams of $MgSO_4$ were added. An excess of solid $KMnO_4$ was added and the oxidation was continued for 3 hours on the steam bath. At the end of this period the sample was still consuming permanganate. Excess sodium bisulfite was added and the solution extracted with two volumes of ethyl acetate. The ethyl acetate extracts were concentrated to dryness and the residue extracted with 10 ml. of boiling benzene. Petroleum ether was added to the benzene extract until incipient trubidity. After cooling the crystals were collected and recrystallized from benzene-petroleum ether to yield about 33 mgs. of the free acid.

Other 3 - hydroxy - 3 - methyl-4-halo-7-(lower alkoxy) phthalides are prepared by the procedure of the above example except that the appropriate 3-methyl-4-halo-7-(lower alkoxy)phthalide is substituted for the 3-methyl-4-chloro-7-methoxyphthalide above. For instance, 3-hydroxy-3-methyl-4-chloro-7-ethoxyphthalide is prepared by substituting an equal molar quantity of 3-methyl-4-chloro-7-ethoxy-phthalide for the 3-methyl-4-chloro-7-methoxy-phthalide employed in the above example.

EXAMPLE II

*3-hydroxy-3-methyl-4-chloro-7-hydroxyphthalide*

METHOD I

Two hundred and ten milligrams of 3-hydroxy-3-methyl-4-chloro-7-methoxyphthalide, prepared by the method of Example I, were dissolved in 10 cc. of 45% HI and refluxed for 2.5 hours. At the end of this time, the solution was diluted with 1 volume of $H_2O$ and then extracted two times with equal volumes of ethyl acetate. The ethyl acetate extracts were shaken with an equal volume of pH 7.0 phosphate buffer (1 M).

The buffer solution was adjusted to pH 2.0 with conc. HCl and extracted with two volumes of ethyl acetate. The ethyl acetate extracts were concentrated to dryness and the residue was crystallized from water. There was obtained about 45 mgs. of 3-hydroxy-3-methyl-4-chloro-7-hydroxyphthalide.

METHOD II

Two hundred and eight milligrams of 3-hydroxy-3-methyl-4-chloro-7-methoxyphthalide was dissolved in 10 ml. of 48% HBr and refluxed for 2.5 hours. The solution was then diluted with an equal volume of water. On cooling, about 107 mgs. of crystalline 3-hydroxy-3-methyl-4-chloro-7-hydroxyphthalide were deposited. Ethyl acetate extraction of the mother liquor and subsequent crystallization from $H_2O$ (two times) yielded an additional 32 mgs. of the acid.

EXAMPLE III

*The pseudo-ethyl ester of 3-hydroxy-3-methyl-4-chloro-7-methoxyphthalide*

Fifteen milligrams of 3-hydroxy-3-methyl-4-chloro-7-methoxyphthalide were dissolved in 4 ml. of absolute ethanol and 1 drop of concentrated sulfuric acid added. The resulting solution was refluxed 2 hours and then allowed to stand at room temperature overnight. The solution was then evaporated to about 0.3 ml., and 10 ml. of pH 7.0 phosphate buffer added, whereby a crystalline precipitate was obtained. The crystalline material was extracted into ethyl acetate and then crystallized from ethanol-$H_2O$ to yield about 11 mgs. of 3-ethoxy-3-methyl-4-chloro-7-methoxyphthalide.

EXAMPLE IV

*Pseudo-methyl ester of 3-hydroxy-3-methyl-4-chloro-7-methoxyphthalide*

Fifty milligrams of 3-hydroxy-3-methyl-4-chloro-7-methoxy-phthalide were dissolved in 5 ml. of absolute MeOH containing 4 drops of conc. $H_2SO_4$. After refluxing for 3 hours the solution was diluted with an equal volume of pH 7.0 phosphate buffer (1 M). The crystals that formed were collected, redissolved in ethyl acetate and the ethyl acetate solution washed with sodium carbonate solution. The ethyl acetate phase was concentrated to dryness and the residue crystallized from methanol and $H_2O$. The yield of 3-methoxy-3-methyl-4-chloro-7-methoxyphthalide was about 40 mgs.

We claim:

1. Compounds selected from the group consisting of the acids represented by the formula:

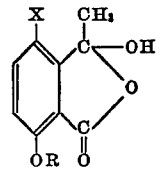

where X represents halogen and R represents a member selected from the group consisting of hydrogen and lower alkyl radicals; and the pseudo-esters of said acids with lower alkyl alcohols.

2. The 3-hydroxy-3-methyl-4-halo-7-(lower alkoxy)-phthalides.

3. The new compound 3-hydroxy-3-methyl-4-chloro-7-methoxyphthalide.

4. The new compound 3-hydroxy-3-methyl-4-chloro-7-ethoxyphthalide.

5. The 3-hydroxy-3-methyl-4-halo-7-hydroxyphthalides.

6. The new compound 3-hydroxy-3-methyl-4-chloro-7-hydroxyphthalide.

7. The 3-(lower alkoxy)-3-methyl-4-halo-7-(lower alkoxy)-phthalides.

8. The new compound 3-methyl-4-chloro-3,7-dimethoxyphthalide.

9. The new compound 3-ethoxy-3-methyl-4-chloro-7-methoxyphthalide.

10. The method of preparing compounds selected from the group consisting of the acids represented by the formula:

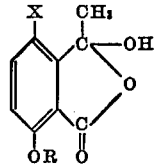

where X represents halogen and R represents a member selected from the group consisting of hydrogen and lower alkyl radicals; and the pseudo-esters of said acids with lower alkyl alcohols, which comprises contacting, in an inert solvent, at a temperature of from about 0° C. to the reflux temperature of the reaction mixture, and at a hydrogen ion concentration of from about pH 6 to pH 10, a compound represented by the formula:

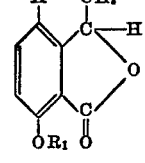

where X represents halogen and $R_1$ represents a lower alkyl radical; with a strong oxidizing agent.

11. The method of claim 10 where said solvent is an aqueous solvent and said oxidizing agent is potassium permanganate.

12. The method of claim 11 where the hydrogen ion concentration is from about pH 7 to pH 8.

No references cited.